United States Patent Office 3,179,494
Patented Apr. 20, 1965

3,179,494
NOVEL PROCESS FOR PREPARING ANTIMONY OXYCHLORIDE
David Regenbogen, Fair Lawn, N.J., assignor to M & T Chemicals Inc., New York, N.Y., a corporation of Delaware
No Drawing. Filed Dec. 26, 1962, Ser. No. 247,380
12 Claims. (Cl. 23—85)

This invention relates to a process for preparing crystalline antimony oxychloride.

Although antimony oxychloride has found use in a wide variety of uses including the preparation of flame resistant compositions and luminescent coatings, this compound has not realized its fullest potential because of the lack of a convenient, economical, and commercially feasible method for its preparation.

Antimony oxychloride has heretofore most commonly been prepared by the hydrolysis of antimony trichloride according to the reaction:

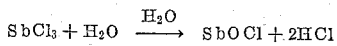

$$SbCl_3 + H_2O \xrightarrow{H_2O} SbOCl + 2HCl$$

This reaction suffers from a great many deficiencies. For example, it is apparent that one mole of antimony trichloride is consumed for each mole of antimony oxychloride produced. Antimony trichloride is a relatively expensive raw material which may be highly corrosive and reactive and, therefore, difficult to handle and store. A substantial portion of the antimony oxychloride produced may be retained in solution, and the yield of desired product may be greatly reduced. Reaction conditions may be critical, since undesirable further hydrolysis may readily occur and the yield of desired antimony oxychloride may be reduced thereby or the product may be undesirably contaminated.

Attempts have heretofore been made to prepare antimony oxychloride from other antimony-containing raw materials such as antimony trioxide. These processes have been found unsatisfactory, particularly for large-scale commercial production, since they may be characterized by low volume efficiency, poor yields, complicated procedures, and contaminated products.

It is an object of this invention to provide a process for preparing antimony oxychloride. It is a further object of this invention to prepare antimony oxychloride from antimony trioxide. Other objects will be apparent to those skilled in the art upon reading the following description.

In accordance with certain of its aspects, the process of this invention for preparing crystalline antimony oxychloride may comprise reacting together in aqueous medium antimony trioxide and hydrogen chloride; adding to said aqueous medium gaseous hydrogen chloride in amount sufficient to maintain a concentration of at least 30% hydrogen chloride, based on the water in said aqueous medium, during and at the end of said reaction thereby forming antimony oxychloride; and separating said antimony oxychloride from said aqueous medium.

The antimony trioxide which may be used in practice of this invention, may typically be a commercial grade of antimony trioxide such as that sold under the trademark Thermoguard H. Commercial material may be employed without further purification.

The aqueous medium which may be employed in practice of this invention may be water. In may contain hydrochloric acid in amount of 0% up to that required to saturate the aqueous medium at typically atmospheric pressure e.g. up to 37%–40% or more by weight. The preferred aqueous medium may be commercial concentrated (i.e. 37%) hydrochloric acid. Typically the aqueous medium may also contain antimony oxychloride in amount of 0% to 50%, and typically 20%–50%, say 40%. The aqueous medium may include at least a portion of a recycle liquor obtained during the course of the process and typically the supernatant liquor or filtrate from which the product antimony oxychloride may be recovered.

In practice of the invention the antimony trioxide may be reacted with hydrogen chloride in the aqueous medium. The aqueous medium employed in the practice of this invention may preferably be present in amount sufficient to produce a readily handleable mixture having desirable properties including good heat transfer properties. Typically at least about 40 and preferably 40 to 500 parts by weight of aqueous medium may be employed per 100 parts by weight of antimony trioxide. Preferably 45 to 150, say 110 parts of aqueous medium per 100 parts of antimony trioxide may be used. Production of product antimony oxychloride may be effected by adding gaseous hydrogen chloride to the aqueous reaction medium. The appropriate amount of antimony trioxide may be added to the aqueous medium either before the gaseous hydrogen chloride is added, during addition of the gaseous hydrogen chloride, or after less than all of the gaseous hydrogen chloride is added.

According to one preferred embodiment of the invention, the entire quantity of antimony trioxide may be added at the beginning of the reaction to the aqueous medium (e.g. water or a concentrated hydrochloric acid) prior to addition of the gaseous hydrogen chloride. According to another preferred embodiment, the antimony trioxide may be added in more than one, and preferably in two portions. In this latter embodiment, 30% to 80% and preferably a minor portion i.e. less than 50%, and typically 33%, of the antimony trioxide may be added to the aqueous reaction medium prior to addition of gaseous hydrogen chloride. Subsequent to the addition of gaseous hydrogen chloride, the second portion comprising 20% to 70%, and preferably a major portion i.e. greater than 50% and typically 67% may be added to the aqueous reaction medium. It is a feature of this embodiment of the invention that it permits the reaction to be carried out under more uniform conditions of reaction including more uniform viscosity, greater degree of control, etc.

Gaseous hydrogen chloride may be added to the aqueous medium while the latter is at temperature of 30° C.–110° C., say 80° C. over a period of 30–120, say 90 minutes. Higher temperature may be employed but no apparent attendant advantages may be thereby attained. Lower temperatures may be employed if desired, but reaction times may be correspondingly increased. When addition of hydrogen chloride is complete, the reaction mixture may be maintained for 30–60 minutes, say 30 minutes at 30° C.–110° C., preferably 100–110° C., say 110° C.

Typically, the reaction may be carried out over a wide range of pressures. Very low pressures may be undesirable since they may render it difficult to maintain the desired concentration of hydrogen chloride in the aqueous medium. Pressures higher than atmospheric pressure may be employed but such higher pressures may not be required. Typically, the process of this invention may be most easily carried out at atmospheric pressure and atmospheric pressure may be preferred.

Gaseous hydrogen chloride to be added to the aqueous medium may be obtained from any desired source including e.g. pressurized cylinders or it may be generated as needed by appropriate reaction between, e.g. concentrated hydrochloric acid and concentrated sulfuric acid etc.

Gaseous hydrogen chloride may be added to the aqueous medium in amount sufficient to maintain a concentration of at least 30% by weight hydrogen chloride, based on the weight of water in said aqueous medium. Typically, this amount may be at least 25 parts and preferably 25–32, say 28–30 parts by weight of hydrogen chloride per 100 parts by weight of antimony trioxide.

Preferably the amount of gaseous hydrogen chloride may be at least 2 and preferably about 2.2–2.4 moles per mole of antimony trioxide.

It is a feature of this invention that at least a portion of the hydrogen chloride content of the aqueous reaction medium may be obtained from the gaseous hydrogen chloride. Preferably the concentration of hydrogen chloride in the aqueous reaction medium will be maintained at desired level by addition of gaseous hydrogen chloride concurrently with formation of product antimony oxychloride. The gaseous hydrogen chloride added will preferably be sufficient to allow for the additional water generated during the course of the reaction.

The addition of the gaseous hydrogen chloride may be effected typically by bubbling the gaseous hydrogen chloride through the slurry of antimony trioxide in the aqueous medium; preferably this may be accompanied by agitation.

During the course of the reaction between the antimony trioxide and the hydrogen chloride, antimony oxychloride may be produced according to the following equation:

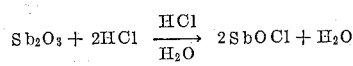

$$Sb_2O_3 + 2HCl \xrightarrow[H_2O]{HCl} 2SbOCl + H_2O$$

The reaction mixture may typically be agitated over the noted period of time at the noted temperature. It may then be cooled to room temperature typically 20° C.–30° C., say 25° C. to precipitate the desired product antimony oxychloride. This may be separated as by filtration or centrifuging at 20° C.–30° C., say 25° C. to recover product antimony oxychloride in yield of usually more than 70%, and typically 70%–80%, say 77% in the form of white crystals. This product on recovery may be found to be in the form of white crystals of purity approaching 100%.

The supernatant mother liquor or filtrate from the recovery of the desired product antimony oxychloride may be an aqueous medium saturated at the temperature of recovery with antimony oxychloride. Typically it may contain 15%–50%, say 40% by weight of antimony oxychloride which may correspond to saturation at 15° C.–25° C., say 20° C. The aqueous medium may also contain preferably at least 30% by weight of hydrogen chloride, and typically 30%–40%, say 37% based on the weight of water present.

This aqueous medium may be recovered and may be recirculated in whole or in part to form at least a portion of the charge aqueous medium in which the antimony trioxide and the hydrochloric acid are to be reacted. Recycle of this liquor is a particular feature of this invention which permits attainment of high yields which approach stoichiometric with minimum loss of material (e.g. hydrogen chloride) from the system. This factor contributes to the high volume efficiency of the reaction system.

It is a particular feature of the novel product that when prepared according to this invention, it may typically consist essentially of crystalline antimony oxychloride having a number average particle or crystal size of about 4–100 microns, and typically 8–35 microns. Preferably the product may contain at least 90%, and typically 95%–100% of the particle in the 4–100 micron range; more commonly at least 80%, and typically 85%–95% of the particles may fall within the 8–35 micron range.

It is a particular feature of the novel product of this invention that it may be used as a flame retardant for organic polymeric materials including e.g. polyvinyl chloride, and that these compositions may be characterized by an unexpectedly high degree of clarity. Addition to polymers such as polyvinyl chloride, of the product of this invention, antimony oxychloride having a particle size distribution in the above-noted range permits attainment of a polymer composition unexpectedly characterized by its high resistance to burning and by its high degree of clarity.

Practice of this invention may be further illustrated by reference to the following examples wherein all parts are parts by weight unless otherwise specified.

*Example 1*

This example illustrates the production of antimony oxychloride in accordance with this invention wherein the antimony trioxide may be added to the aqueous medium in more than one portion. 112 grams of concentrated hydrochloric acid (37% HCl) was placed in a flask and 88.5 grams (.30 mole) of antimony trioxide was added thereto with agitation. A gas bubbling tube was inserted below the surface of the liquid and the temperature was raised to 80–90° C. 76.1 grams (2.08 moles) of gaseous hydrogen chloride was bubbled into the stirred mixture over a period of 65 minutes. 176.5 grams (0.61 mole) of antimony trioxide was then added with stirring. The mixture was heated to reflux (110° C.) for 30 minutes, then cooled to 25° C. The crystalline mass of antimony oxychloride was filtered off and both the solid and the filtrate were recovered. The yield was 242.5 grams (77%) of antimony oxychloride having an analysis of 69.84% Sb (70.3% theory) and 19.80% Cl (20.5% theory) and a number average particle size of 11.2 microns. 107 milliliters of aqueous medium saturated with antimony oxychloride was recovered.

*Example 2*

Example 1 was repeated except that the aqueous medium recovered from Example 1 was employed in place of fresh, concentrated hydrochloric acid. The yield was 291.8 grams (92.6%) of antimony oxychloride having an analysis of 69.63% Sb and 20.07% Cl and a number average particle size of 16 microns. Four further preparations were conducted, each of which utilized the aqueous medium recovered from its preceding preparation. The average results from these preparations were

| | |
|---|---|
| Yield _____ percent____ | 92.2 |
| Percent Sb _____ do____ | 70.46 |
| Percent Cl _____ do____ | 20.12 |
| Particle size _____ microns__ | 13.8 |

*Example 3*

This example illustrates practice of an embodiment of this invention wherein all of the antimony trioxide is added prior to the addition of the hydrogen chloride gas.

1050 grams (3.61 moles) of antimony trioxide was added to a reaction flask together with 35.8 grams of concentrated hydrochloric acid (37%). 302 grams (8.27 moles) of gaseous hydrogen chloride and 451.2 grams of concentrated hydrochloric acid were added concurrently while maintaining the temperature at 96–104° C. When the additions were complete, the mixture was maintained at 96–104° C. with stirring for one additional hour. The mixture was then cooled and the solid material separated by centrifuging. The yield was 845 grams of antimony oxychloride having an analysis of 70.5% Sb and 20.2% Cl.

Although this invention has been described with reference to specific details it will be apparent to those skilled in the art that various modifications may be made therein without departing from the scope of the claims wherein all parts and percentages are by weight unless otherwise specified.

I claim:
1. The process for preparing crystalline antimony oxychloride which comprises reacting together in aqueous medium antimony trioxide with hydrogen chloride; adding to said aqueous medium gaseous hydrogen chloride in amount sufficient to maintain a concentration of at least 30% hydrogen chloride, based on the water in said aqueous medium, during and at the end of said reaction thereby forming antimony oxychloride; and separating said antimony oxychloride from said aqueous medium.

2. The process for preparing crystalline antimony oxychloride as claimed in claim 1 wherein the amount of gaseous hydrogen chloride added is at least 25 parts per 100 parts of antimony trioxide.

3. The process for preparing crystalline antimony oxychloride as claimed in claim 1 wherein said reaction is carried out at 30–110° C. and atmospheric pressure.

4. The process for preparing crystalline antimony oxychloride as claimed in claim 1 wherein the aqueous medium is present in the amount of 40–500 parts per 100 parts of antimony trioxide.

5. The process for preparing crystalline antimony oxychloride which comprises reacting together in 45–150 parts of aqueous medium 100 parts of antimony trioxide with hydrogen chloride; adding to said aqueous medium gaseous hydrogen chloride in amount of 28–30 parts and sufficient to maintain a concentration of 30–40% hydrogen chloride based on the water in said aqueous medium during and at the end of said reaction thereby forming antimony oxychloride; and separating said antimony oxychloride from said aqueous medium.

6. The process for preparing crystalline antimony oxychloride as claimed in claim 5 wherein said reaction is carried out at a temperature of 30–110° C. and atmospheric pressure.

7. The process for preparing crystalline antimony oxychloride which comprises reacting together in an initial aqueous medium antimony trioxide with hydrogen chloride; adding to said equeous medium gaseous hydrogen chloride in amount sufficient to maintain a concentration of at least 30% hydrogen chloride, based on the water, in said aqueous medium during and at the end of said reaction thereby forming antimony oxychloride; separating said antimony oxychloride from said aqueous medium; recovering said aqueous medium; and recycling at least a portion of said recovered aqueous medium to form at least a portion of said initial aqueous medium.

8. The process for preparing crystalline antimony oxychloride as claimed in claim 7 wherein the amount of gaseous hydrogen chloride added is at least 25 parts per 100 parts of antimony trioxide.

9. The process for preparing crystalline antimony oxychloride as claimed in claim 7 wherein said reaction is carried out at a temperature of 30–110° C. and atmospheric pressure.

10. The process for preparing crystalline antimony oxychloride as claimed in claim 7 wherein the initial aqueous medium is present in the amount of 40–500 parts per 100 parts of antimony trioxide.

11. The process for preparing antimony oxychloride which comprises reacting together in 45–150 parts of an initial aqueous medium 100 parts of antimony trioxide with hydrogen chloride; adding to said aqueous medium gaseous hydrogen chloride in amount of 28–30 parts and sufficient to maintain a concentration of 30–40% hydrogen chloride based on the water in said aqueous medium during and at the end of said reaction thereby forming antimony oxychloride; separating said antimony oxychloride from said aqueous medium; and recycling at least a portion of said recovered aqueous medium to form at least a portion of said initial aqueous medium.

12. The process for preparing crystalline antimony oxychloride as claimed in claim 11 wherein said reaction is carried out at 30–110° C. and atmospheric pressure.

References Cited by the Examiner

C. A. Jacobson's book, "Encyclopedia of Chemical Reactions," vol. 1, 1946, page 243. The Reinhold Pub. Corp., N.Y.

J. B. Moyer. J. Am. Chem. Soc., 18, 1032 (1896).

J. W. Mellor's "A Comprehensive Treatise on Inorganic and Theoretical Chemistry," vol. 9, 1929 edition, pages 504, 505, Longmans, Green & Co., N.Y.

MAURICE A. BRINDISI, *Primary Examiner.*